(12) United States Patent
Fu et al.

(10) Patent No.: US 12,467,811 B2
(45) Date of Patent: Nov. 11, 2025

(54) SEALING PIN, PRESSURE DETENTION MODULE AND PRESSURE SENSOR

(71) Applicant: Measurement Specialties (China) Ltd., Shenzhen (CN)

(72) Inventors: Tinghui (Felix) Fu, Shenzhen (CN); Xu Liang, Shenzhen (CN); Long (Allen) Wang, Shenzhen (CN)

(73) Assignee: Measurement Specialties (China) Ltd., Shenzhen (CN)

( * ) Notice: Subject to any disclaimer, the term of this patent is extended or adjusted under 35 U.S.C. 154(b) by 359 days.

(21) Appl. No.: 17/980,115

(22) Filed: Nov. 3, 2022

(65) Prior Publication Data

US 2023/0135371 A1 May 4, 2023

(30) Foreign Application Priority Data

Nov. 4, 2021 (CN) .......................... 202111299135.9

(51) Int. Cl.
*G01L 9/00* (2006.01)
*G01L 19/14* (2006.01)

(52) U.S. Cl.
CPC ............ *G01L 9/0041* (2013.01); *G01L 19/14* (2013.01)

(58) Field of Classification Search
CPC ... G01L 9/0041; G01L 19/14; G01L 19/0007; G01L 19/0046; G01L 19/06; G01L 19/0672; G01L 19/0645; G01L 7/102
See application file for complete search history.

(56) References Cited

U.S. PATENT DOCUMENTS

| | | | | |
|---|---|---|---|---|
| 136,530 | A * | 3/1873 | Mcintyre | A01B 33/06 411/339 |
| 722,061 | A * | 3/1903 | Waldo | F16B 21/06 402/48 |
| 934,960 | A * | 9/1909 | Dreibuss | A01B 33/06 411/339 |
| 1,330,673 | A * | 2/1920 | Anderson | B21D 39/06 81/460 |
| 2,065,333 | A * | 12/1936 | Kirley | F16B 19/1027 411/339 |
| 2,160,686 | A * | 5/1939 | Splaine | G02C 1/023 411/339 |
| 2,236,804 | A * | 4/1941 | Miller | F16B 19/02 411/339 |
| 2,833,325 | A * | 5/1958 | Laisy | F16B 35/06 411/929 |
| 3,241,423 | A * | 3/1966 | Davis | F16B 35/06 411/399 |
| 4,759,670 | A * | 7/1988 | Linder | F16B 19/1081 411/908 |
| 5,222,397 | A * | 6/1993 | Kodama | G01L 19/0084 338/42 |

(Continued)

*Primary Examiner* — Nathaniel J Kolb
(74) *Attorney, Agent, or Firm* — Barley Snyder

(57) ABSTRACT

A sealing pin includes a body part and an end part connected to the body part. The body part is insertable into a liquid filling path of a pressure sensor. The body part has a groove on an outer surface. The end part seals a liquid filling port of the liquid filling path. When the sealing pin is inserted into the liquid filling path, an external media pressure applied to a diaphragm of the pressure sensor is transmitted to a pressure detection chip of the pressure sensor through a liquid in the groove.

20 Claims, 7 Drawing Sheets

(56) References Cited

U.S. PATENT DOCUMENTS

| | | | | |
|---|---|---|---|---|
| 5,924,906 A | * | 7/1999 | Grafton | ................. A63H 33/10 446/124 |
| 6,338,602 B1 | * | 1/2002 | Gombert | ............... F16B 21/073 411/908 |
| 2002/0053241 A1 | * | 5/2002 | Morikawa | ........... G01L 19/0084 73/729.1 |

* cited by examiner

SEALING PIN, PRESSURE DETENTION MODULE AND PRESSURE SENSOR

CROSS-REFERENCE TO RELATED APPLICATION

This application claims the benefit of the filing date under 35 U.S.C. § 119(a)-(d) of Chinese Patent Application No. 202111299135.9, filed on Nov. 4, 2021.

FIELD OF THE INVENTION

The present invention relates to a sealing pin, a pressure detection module including the sealing pin and a pressure sensor including the pressure detection module.

BACKGROUND

A pressure sensor usually includes a main body, a diaphragm, and a pressure detection chip. An oil filled cavity is formed in the main body, and the external media pressure applied to the diaphragm can be transmitted to the pressure detection chip through the oil in the oil filled cavity. Therefore, the pressure detection chip can detect the external media pressure applied to the diaphragm.

In the prior art, after the oil filling cavity is filled with oil, the oil filling port of the oil filling cavity needs to be sealed with a ball to prevent oil leakage. The existing technical scheme requires filling the whole oil filling cavity with oil, which deteriorates the temperature characteristics of the pressure sensor and reduces the detection accuracy of the pressure sensor.

SUMMARY

A sealing pin includes a body part and an end part connected to the body part. The body part is insertable into a liquid filling path of a pressure sensor. The body part has a groove on an outer surface. The end part seals a liquid filling port of the liquid filling path. When the sealing pin is inserted into the liquid filling path, an external media pressure applied to a diaphragm of the pressure sensor is transmitted to a pressure detection chip of the pressure sensor through a liquid in the groove.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
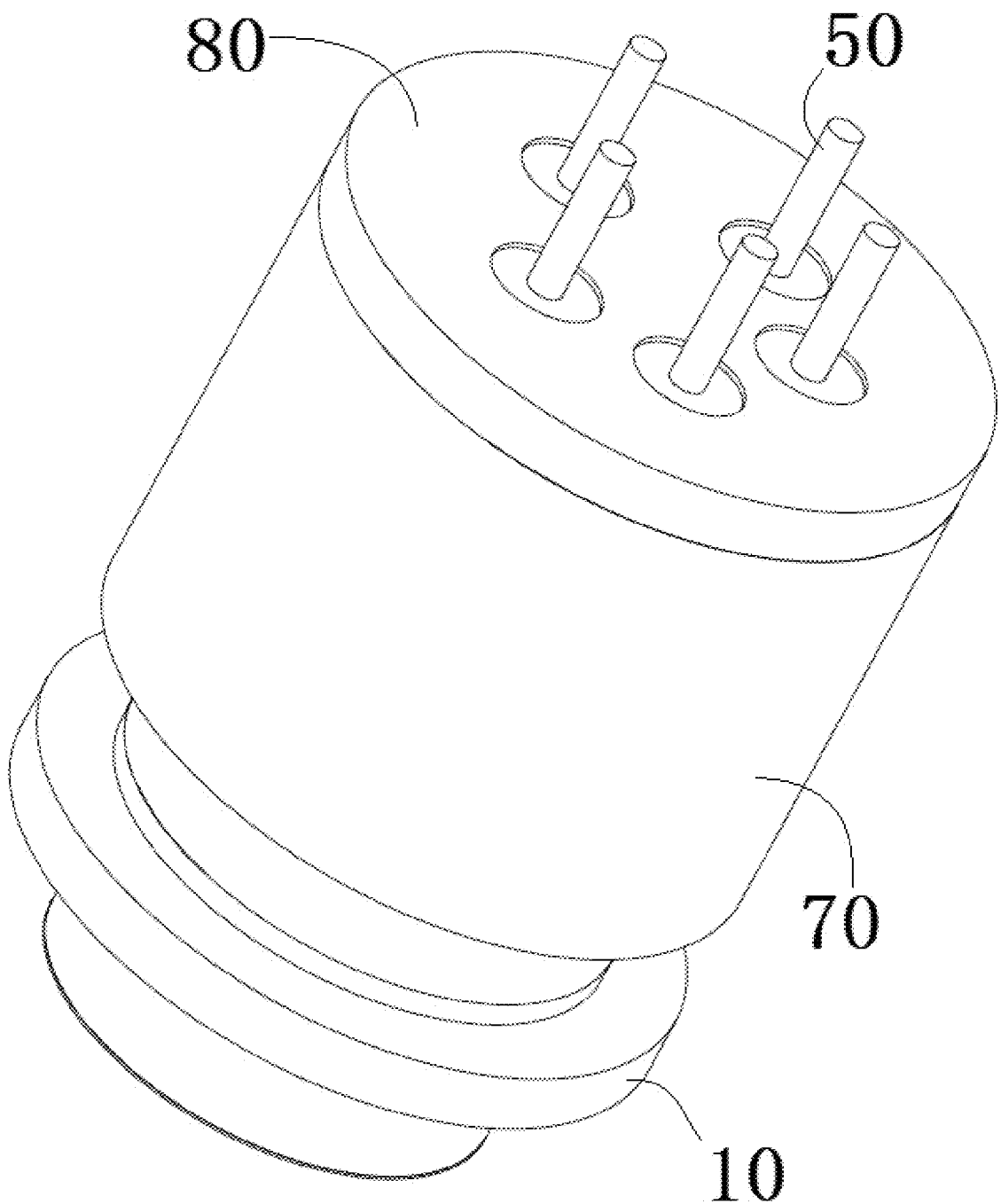
FIG. 1 is a perspective view of a pressure sensor according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
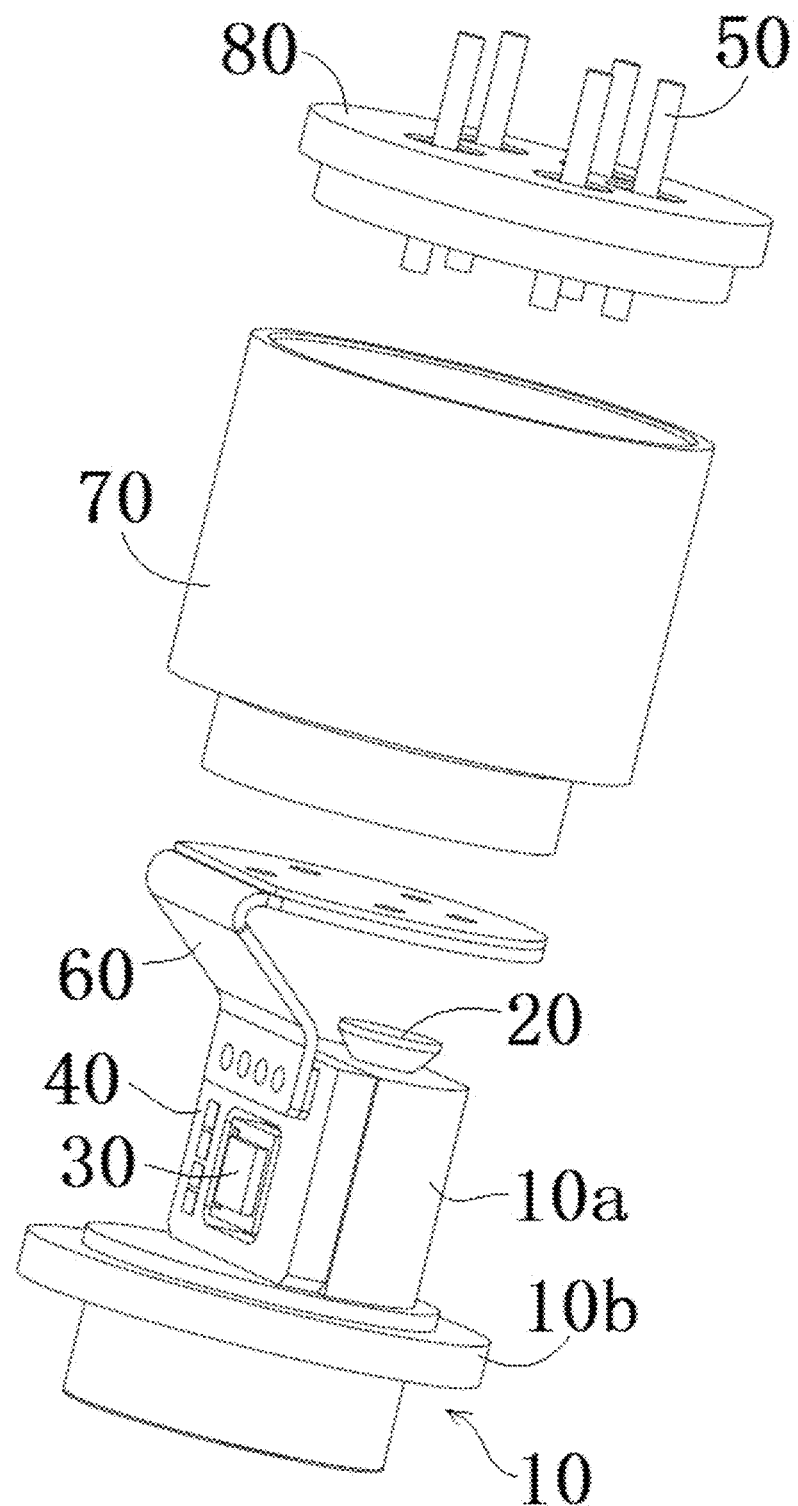
FIG. 2 is an exploded perspective view of the pressure sensor.

A pressure sensor according to an embodiment, as shown in FIG. 1 and FIG. 2, includes a housing 70 and a pressure detection module. The pressure detection module is installed in housing 70.

As shown in FIGS. 1 to 4, in the illustrated embodiment, the pressure detection module includes: a main body 10, a sealing pin 20, a pressure detection chip 30, and a diaphragm 1. A liquid filling cavity 11, 12, 13 for filling liquid is formed in the main body 10. The liquid filling cavity 11, 12, 13 includes a liquid filling path 13. The diaphragm 1 is attached to the main body 10 for transmitting an external media pressure to the liquid in the liquid filling cavity 11, 12, 13. The pressure detection chip 30 is installed on the main body 10 to detect the liquid pressure in the liquid filling cavity 11, 12, 13. The sealing pin 20 is inserted into the liquid filling path 13 and seals the liquid filling port 13a of the liquid filling path 13.

Figure 3:
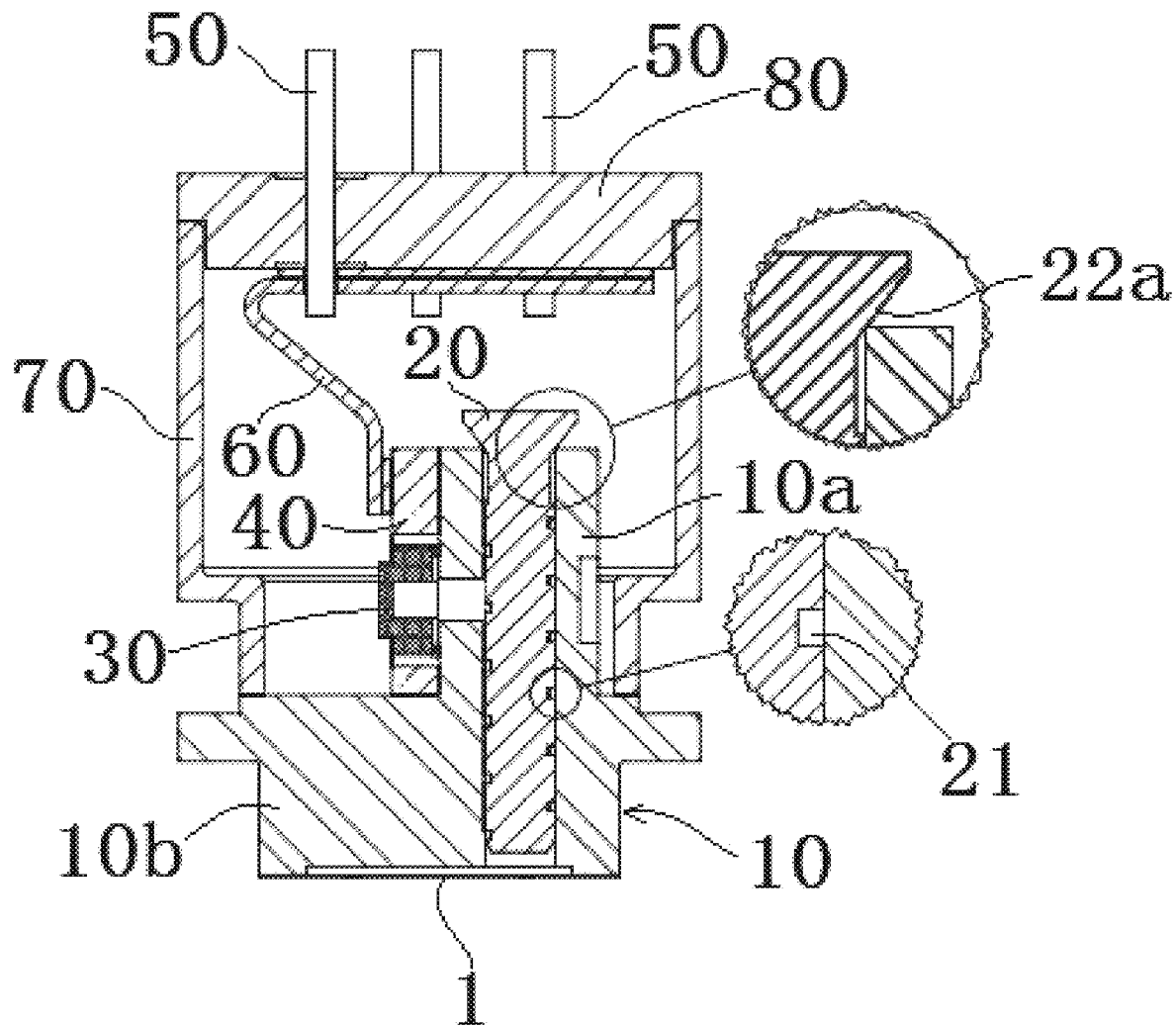
FIG. 3 is an axial sectional view of the pressure sensor.
Figure 5:
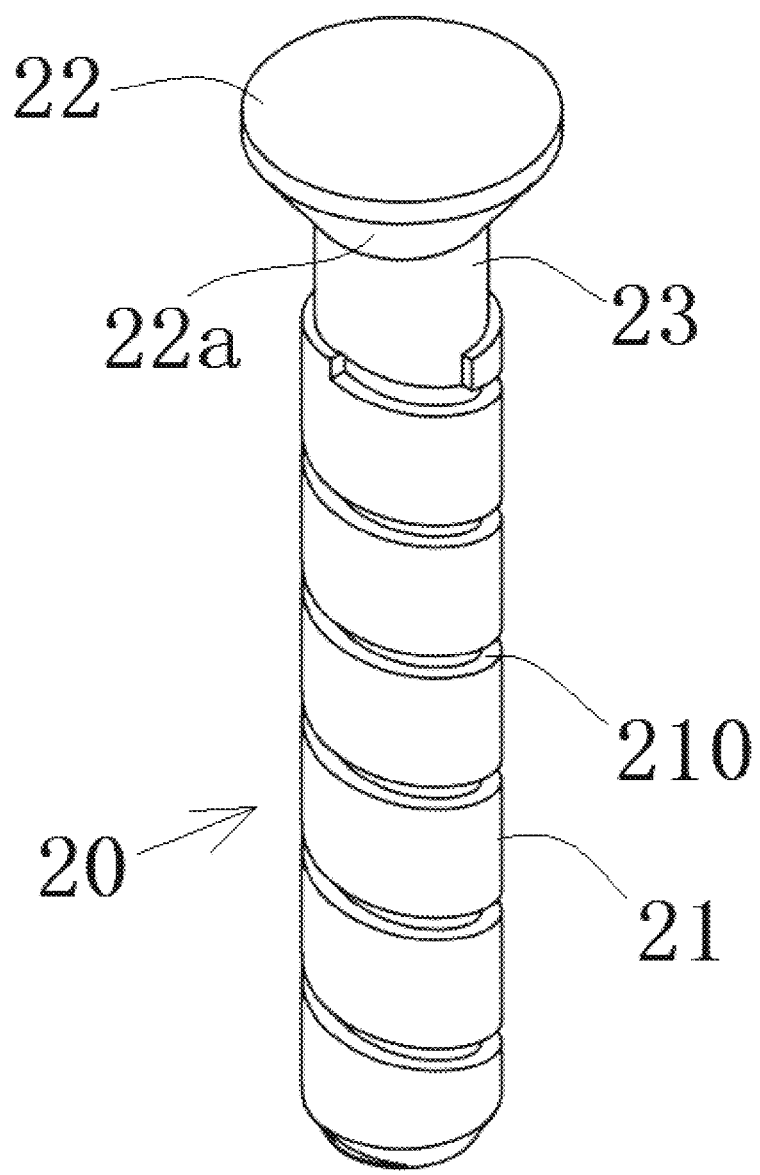
FIG. 5 is a perspective view of a sealing pin according to an embodiment.
Figure 6:
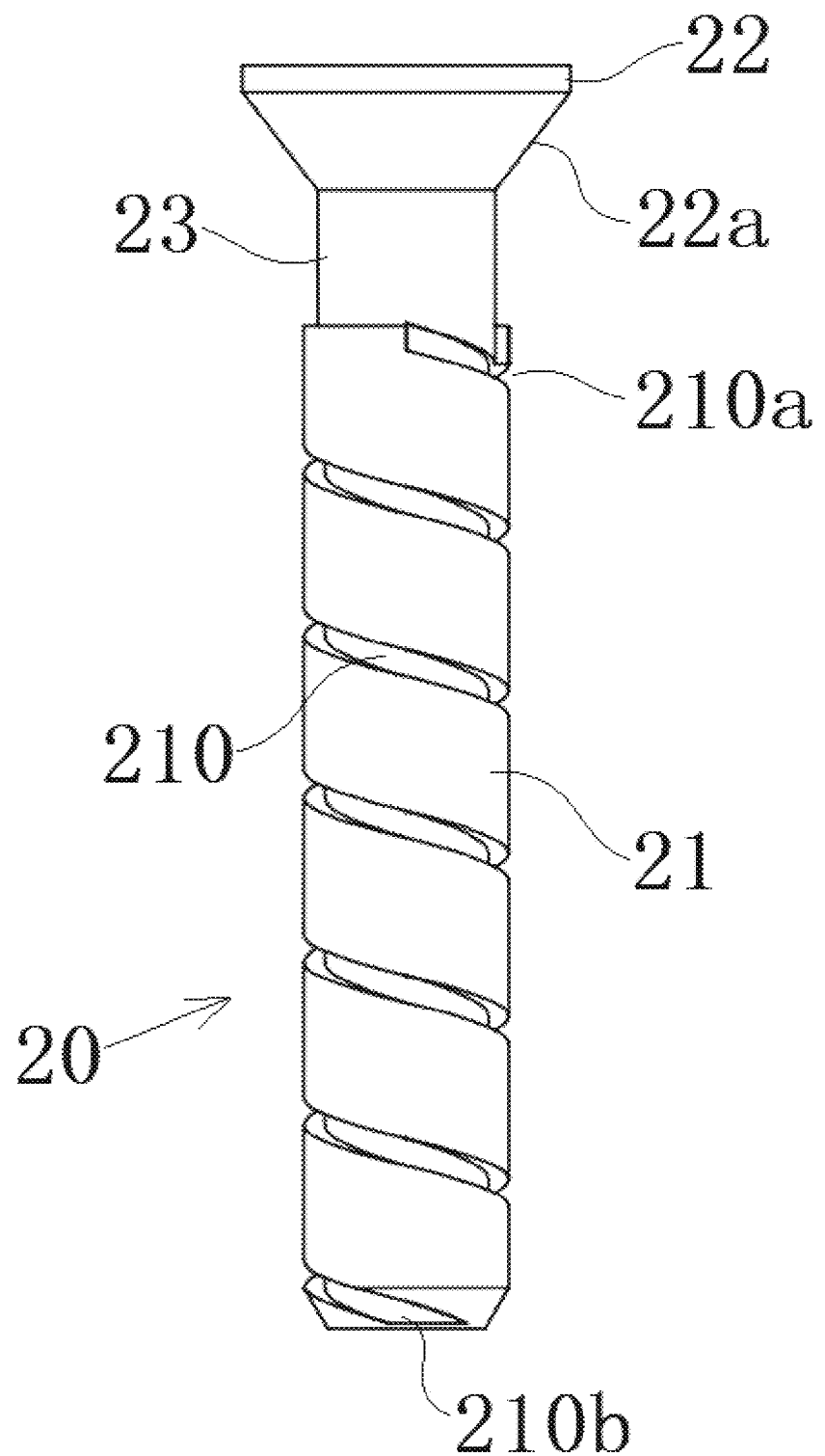
FIG. 6 is a plan view of the sealing pin.

The sealing pin 20, as shown in FIGS. 3, 5, and 6, includes a body part 21 and an end part 22. The body part 21 of the sealing pin 20 is inserted into the liquid filling path 13 of the pressure sensor, and a groove 210 is formed on the outer surface of the body part 21. The end part 22 of the sealing pin 20 is connected to the body part 21 for sealing the liquid filling port 13a of the liquid filling path 13.

When the sealing pin 20 is inserted into the liquid filling path 13, as shown in FIGS. 2 and 3, the external media pressure applied to the diaphragm 1 of the pressure sensor can be transmitted to the pressure detection chip 30 of the pressure sensor through the liquid in the groove 210. The liquid filled in the liquid filling path 13 includes but is not limited to oil.

In the illustrated embodiment, the groove 210 on the sealing pin 20 is a spiral groove extending along the spiral path. However, the present invention is not limited to this, and the groove 210 may also have other suitable shapes. In the embodiments shown in FIGS. 3, 5, and 6, a single spiral groove is formed on the body part 21 of the sealing pin 20. However, the present invention is not limited to this, and a plurality of helical grooves separated from each other may be formed on the body part 21 of the sealing pin 20.

As shown in FIGS. 5 and 6, in the illustrated embodiment, the body part 21 has a root adjacent to the end part 22 and an end opposite to the end part 22. The groove 210 extends from the root of the body part 21 to the end of the body part 21. The groove 210 has an inlet 210a located at the root of the body part 21 and an outlet 210b located at the end of the body part 21. In the shown embodiment, the liquid filled from the liquid filling port 13a of the liquid filling path 13 can flow to the entire liquid filling cavity 11, 12, 13 of the pressure sensor through the groove 210 of the sealing pin 20.

In the illustrated embodiment, the body part 21 of the sealing pin 20 is cylindrical, and the outer diameter of the body part 21 is set to be equal to or slightly smaller than the inner diameter of the liquid filling path 13.

As shown in the embodiment of FIGS. 5 and 6, the sealing pin 20 also includes a neck 23 connected between the body part 21 and the end part 22. In the illustrated embodiment, the body part 21 and the neck 23 of the sealing pin 20 are cylindrical, and the outer diameter of the neck 23 is smaller than that of the body part 21.

As shown in FIGS. 3, 5, and 6, in the illustrated embodiment, the end part 22 of the sealing pin 20 has a conical sealing surface 22a, which is welded to the inner peripheral wall of the liquid filling port 13a of the liquid filling path 13 to seal the liquid filling port 13a of the liquid filling path 13. In the illustrated embodiment, after filling the liquid, the end part 22 of the sealing pin 20 is welded to the inner peripheral wall of the liquid filling port 13a of the liquid filling path 13, thereby sealing the liquid filling port 13a of the liquid filling path 13 to prevent liquid leakage during use.

In an embodiment, a pressure detection module is disclosed. The pressure detection module includes a main body 10, a diaphragm 1, a pressure detection chip 30 and the sealing pin 20. A liquid filling cavity 11, 12 and 13 for liquid filling is formed in the main body 10. The liquid filling cavity 11, 12 and 13 includes a liquid filling path 13. The diaphragm 1 is attached to the main body 10 and is used to transmit an external media pressure to the liquid in the liquid filling cavity 11, 12 and 13. The pressure detection chip 30 is installed on the main body 10 to detect the liquid pressure in the liquid filling cavity 11, 12 and 13. The sealing pin 20 is inserted into the liquid filling path 13 and seals the liquid filling port 13a of the liquid filling path 13.

Figure 4:
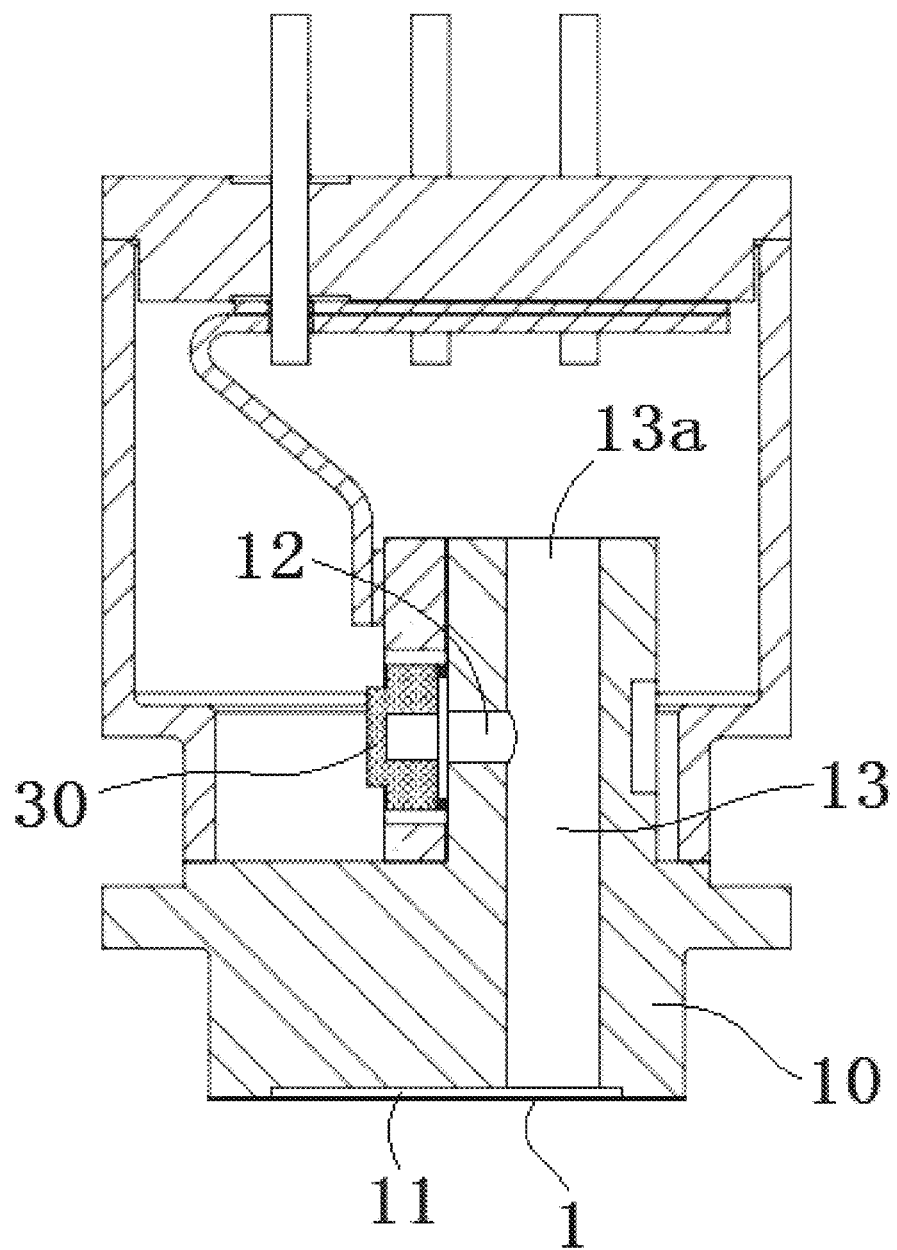
FIG. 4 is an axial sectional view of the pressure sensor without a sealing pin.

As shown in FIG. 4, the liquid filling cavity 11, 12 and 13 in the main body 10 also includes a first chamber 11 and a second chamber 12 communicating with the liquid filling path 13. The diaphragm 1 is attached to the opening of the first chamber 11 of the main body 10 to seal the opening of the first chamber 11, and the pressure detection chip 30 is installed on the opening of the second chamber 12 of the main body 10 to seal the opening of the second chamber 12. The first chamber 11 and the second chamber 12 of the main body 10 are connected with each other through the groove 210 on the sealing pin 20, so that the external media pressure applied to the diaphragm 1 can be transmitted to the pressure detection chip 30 through the liquid in the groove 210.

In the shown embodiment, the liquid filling port 13a of the liquid filling path 13 is connected with the first chamber 11 and the second chamber 12 through the groove 210 on the sealing pin 20, so that the liquid filled from the liquid filling port 13a of the liquid filling path 13 can flow through the groove 210 to the entire liquid filling cavity 11, 12, 13 of the pressure sensor.

In an embodiment, a pressure sensor is disclosed. The pressure sensor comprises a housing 70 and the aforementioned pressure detection module, which is partially received in the housing 70.

The main body 10 of the pressure detection module includes a base part 10b and an installation part 10a, as shown in FIGS. 2 and 3. The base part 10b is located outside the housing 70 and attached to one end of the housing 70. The installation part 10a is connected to the top surface of the base part 10b and is accommodated inside the housing 70. The pressure detection chip 30 of the pressure detection module is installed on the installation part 10a, and the diaphragm 1 of the pressure detection module is attached to the bottom surface of the base part 10b.

As shown in FIG. 4, the liquid filling port 13a of the liquid filling path 13 of the pressure detection module is formed on an end surface of the installation part 10a, and the pressure detection chip 30 is mounted on a side surface of the installation part 10a.

As shown in FIGS. 2 and 3, in the illustrated embodiment, the pressure sensor also includes a circuit board 40, which is mounted on the installation part 10a of the main body 10 and electrically connected with the pressure detection chip 30.

As shown in FIGS. 1-3, the pressure sensor also includes an end cover 80 and a plurality of connection terminals 50. The end cover 80 is installed on the opening formed on the other end of the housing 70. The connection terminals 50 are fixed to the end cover 80. The connection terminals 50 pass through the end cover 80 and are electrically connected to the circuit board 40.

In an embodiment, as shown in FIGS. 2 and 3, the pressure sensor also includes a flexible flat cable 60 for electrically connecting the circuit board 40 to the connection terminals 50.

Figure 7:
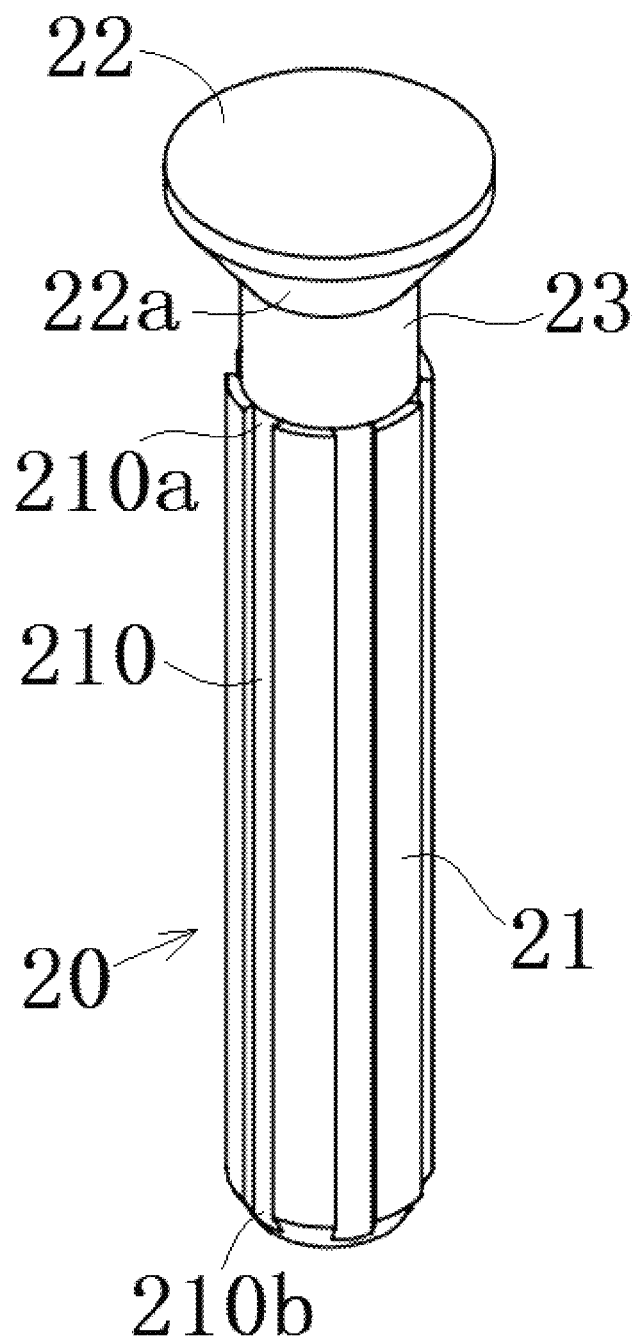
FIG. 7 is a perspective view of a sealing pin according to another embodiment.

A sealing pin 20 according to another embodiment is shown in FIG. 7. The difference between the sealing pin 20 shown in FIG. 7 and the sealing pin 20 shown in FIGS. 1-6 lies only in the shape of the groove 210. In the embodiment shown in FIG. 7, at least one groove 210 is formed on the outer surface of the body part 21 of the sealing pin 20, and the groove 210 extends along a straight line parallel to the axis of the sealing pin 20. As shown in FIG. 7, a plurality of grooves 210 extending linearly are formed on the outer surface of the body part 21 of the sealing pin 20, and the grooves 210 are evenly spaced around the circumference of the body part 21 of the sealing pin 20.

In the foregoing exemplary embodiments according to the present invention, the sealing pin 20 is inserted into the liquid filling path 13 of the liquid filling cavity 11, 12, 13, so that the liquid filling amount can be reduced, the temperature characteristics of the pressure sensor can be improved, and the detection accuracy of the pressure sensor can be greatly improved.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A pressure sensor, comprising:
a liquid filling path having a liquid filling port;
a diaphragm;
a pressure detection chip; and a sealing pin having a groove, the sealing pin is inserted into the liquid filling path and seals the liquid filling port, an external media pressure applied to the diaphragm is transmitted to the pressure detection chip through a liquid in the groove.

2. The pressure sensor of claim 1, wherein the groove is a spiral groove extending along a spiral path or a linear groove extending along a linear path.

3. The pressure sensor of claim 2, wherein a body part of the sealing pin has a root adjacent to an end part of the sealing pin and an end opposite to the root, the groove extends from the root to the end of the body part.

4. The pressure sensor of claim 3, wherein the groove has an inlet at the root of the body part and an outlet at the end of the body part.

5. The pressure sensor of claim 1, wherein a body part of the sealing pin is cylindrical.

6. The pressure sensor of claim 1, wherein the sealing pin has a neck connected between a body part of the sealing pin and an end part of the sealing pin.

7. The pressure sensor of claim 6, wherein the body part and the neck are cylindrical, and an outer diameter of the neck is smaller than an outer diameter of the body part.

8. The pressure sensor of claim 1, wherein the sealing pin has a conical sealing surface weldable to an inner peripheral wall of the liquid filling port to seal the liquid filling port.

9. A pressure detection module, comprising:
a main body having a liquid filling cavity including a liquid filling path;
a diaphragm attached to the main body and transmitting an external media pressure to a liquid in the liquid filling cavity;
a pressure detection chip installed on the main body and detecting a liquid pressure in the liquid filling cavity; and
a sealing pin including a body part inserted into the liquid filling path, the body part having a groove on an outer surface, and an end part connected to the body part, the end part sealing a liquid filling port of the liquid filling path, the external media pressure applied to the diaphragm is transmitted to the pressure detection chip through a liquid in the groove.

10. The pressure detection module of claim 9, wherein the liquid filling cavity further comprises a first chamber and a second chamber communicated with the liquid filling path.

11. The pressure detection module of claim 10, wherein the diaphragm seals an opening of the first chamber and the pressure detection chip seals an opening of the second chamber.

12. The pressure detection module of claim 11, wherein the first chamber and the second chamber of the main body are communicated with each other through the groove of the sealing pin.

13. The pressure detection module of claim 11, wherein the liquid filling port of the liquid filling path is communicated with the first chamber and the second chamber through the groove of the sealing pin, the liquid in the liquid filling port flows from the first chamber to the second chamber through the groove.

14. The pressure detection module of claim 9, wherein the body part is cylindrical, and an outer diameter of the body part is equal to or slightly smaller than an inner diameter of the liquid filling path.

15. A pressure sensor, comprising:
a housing; and
a pressure detection module installed in the housing, the pressure detection module including:
a main body having a liquid filling cavity including a liquid filling path;
a diaphragm attached to the main body and transmitting an external media pressure to a liquid in the liquid filling cavity;
a pressure detection chip installed on the main body and detecting a liquid pressure in the liquid filling cavity; and
a sealing pin including a body part inserted into the liquid filling path, the body part having a groove on an outer surface, and an end part connected to the body part, the end part sealing a liquid filling port of the liquid filling path, the external media pressure applied to the diaphragm is transmitted to the pressure detection chip through a liquid in the groove.

16. The pressure sensor of claim 15, wherein the main body of the pressure detection module includes:
a base part located outside the housing and attached to an end of the housing; and
an installation part connected to a top surface of the base part and accommodated inside the housing, the pressure detection chip is installed on the installation part, the diaphragm of the pressure detection module is attached to a bottom surface of the base part.

17. The pressure sensor of claim 16, wherein the liquid filling port is formed on an end surface of the installation part, and the pressure detection chip is mounted on a side surface of the installation part.

18. The pressure sensor of claim 16, further comprising a circuit board installed on the installation part of the main body and electrically connected with the pressure detection chip.

19. The pressure sensor of claim 18, further comprising:
an end cover installed on an opening formed on another end of the housing; and
a connection terminal fixed to the end cover, the connection terminal passes through the end cover and is electrically connected with the circuit board.

20. The pressure sensor of claim 19, further comprising a flexible flat cable electrically connecting the circuit board to the connection terminal.

* * * * *